United States Patent Office
3,027,398
Patented Mar. 27, 1962

3,027,398
PROCESS FOR PREPARING DIMETHYL 1,4-CYCLOHEXANEDICARBOXYLATE
William Logan Foohey, Penns Grove, N.J., assignor to E. I. du Pont de Nemours and Company, Wilmington, Del., a corporation of Delaware
No Drawing. Filed Feb. 1, 1960, Ser. No. 5,618
2 Claims. (Cl. 260—468)

This invention is directed to an improvement in the conventional process for preparing dimethyl 1,4-cyclohexanedicarboxylate by the catalytic hydrogenation of dimethyl terephthalate. This improvement is based on the use of dimethyl 1,4-cyclohexanedicarboxylate as solvent in the hydrogenation of dimethyl terephthalate. The use of this solvent in the present process unexpectedly gives unique and important advantages over the catalytic hydrogenation of dimethyl terephthalate according to any of the heretofore disclosed methods.

Complete hydrogenation of the aromatic ring in dimethyl terephthalate is now achieved without causing excessive decarboxylation (formation of the highly objectionable methyl hexahydro-p-toluate) which in the heretofore disclosed hydrogenation methods significantly lowers the yield and impairs the quality of the final product.

The present novel process avoids the comparatively high temperatures and pressures which in the prior art methods had to be employed in order to complete the hydrogenation in a reasonable time.

Furthermore, this improved process avoids the use of toxic, inflammable, and highly volatile solvents such as methanol which in the hydrogenation of dimethyl terephthalate according to the disclosed procedure in U.S. Patent 2,070,770 had to be employed in relatively large quantities (at least 2 parts) because of the limited solubility of dimethyl terephthalate in this solvent. Recent attempts to replace methanol in this process with the more effective and somewhat higher boiling solvent dioxane, did not solve the problems indicated above, as is illustrated in one of the following examples.

In addition, in the present novel process, the recovery and distillation of the final product is greatly simplified and cheapened because, after completing the hydrogenation, no solvent remains to be separated from the reaction product by the heretofore necessary carefully controlled distillation in a relatively expensive fractionation still. Because of its homogeneity and relatively high purity, the crude reaction product as obtained according to this invention can be refined by "topping" or by a routine distillation in the simplest type of equipment to give dimethyl 1,4-cyclohexanedicarboxylate at minimum cost in significantly improved yield and excellent quality.

Dimethyl 1,4-cyclohexanedicarboxylate was first described in its cis and trans forms by Baeyer in Ann., 245 (1888), pp. 161 and 171. The first catalytic hydrogenation recipe for preparing the conventional mixture of the two stereo-isomers, directly from dimethyl terephthalate, was disclosed by Fichter and Holbro in Helv. Chim. Acta, 21 (1938), pp. 141–2. This method called for the use of glacial acetic acid as the solvent, which renders the method unacceptable as a basis for a large-scale manufacturing process.

It is, therefore, an object of the present invention to provide a novel process for preparing dimethyl 1,4-cyclohexanedicarboxylate. It is a further object of this invention to provide such a novel process wherein dimethyl terephthalate is catalytically hydrogenated to dimethyl 1,4-cyclohexanedicarboxylate, the solvent significantly utilized being dimethyl 1,4-cyclohexanedicarboxylate to give the hereinafter described unexpected results.

These and other objects will become apparent in the following description and claims.

More specifically, the present invention is directed to the process for converting, by catalytic hydrogenation, dimethyl terephthalate to dimethyl 1,4-cyclohexanedicarboxylate, which process comprises hydrogenating dimethyl terephthalate in a mixture or solution containing 25% to 90% by weight of dimethyl 1,4-cyclohexanedicarboxylate at a temperature in the range of 110° C. to 140° C., and under a pressure of about 500 p.s.i.g. to about 1500 p.s.i.g. in the presence of a hydrogenation catalyst.

A preferred embodiment of this novel process is one in which the dimethyl terephthalate is dissolved, prior to the hydrogenation, in an approximately equal amount of dimethyl 1,4-cyclohexanedicarboxylate, the hydrogenation is carried out at 120–130° C. under a pressure of 750–1000 p.s.i.g., and the catalyst comprises ruthenium supported by an inert substrate.

This invention is based on the discovery that dimethyl terephthalate can be dissolved at about 110° C. in its own weight of crude or distilled dimethyl 1,4-cyclohexanedicarboxylate, and that in this solution dimethyl terephthalate can be hydrogenated rapidly and completely at the surprisingly low temperature of 120–130° C. and at a pressure not exceeding 1000 p.s.i.g. It was further discovered that under these unusually mild hydrogenation conditions, and using only about 0.01 to 0.014 part of a standard (5%) ruthenium catalyst (corresponding to 0.0005 to 0.0007 part of the catalytic metal per part of the ester), an almost theoretical yield and surprisingly high quality of the final product are obtained. In the hydrogenation according to the present invention, the formation of the highly objectionable methyl hexahydro-p-toluate and other volatile impurities does not exceed a maximum of about 2% of the total hydrogenated product.

The known chemical reactions involved in this process are illustrated below.

(A) MAIN REACTION

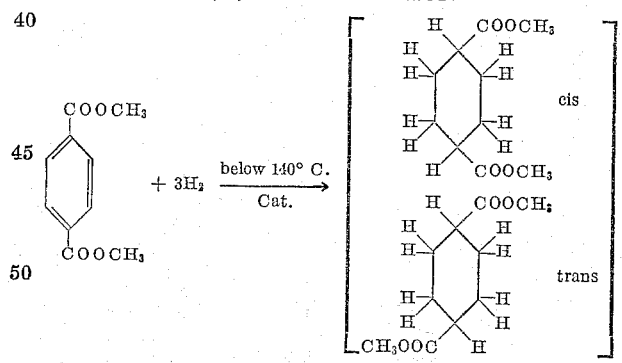

(B) SIDE REACTION

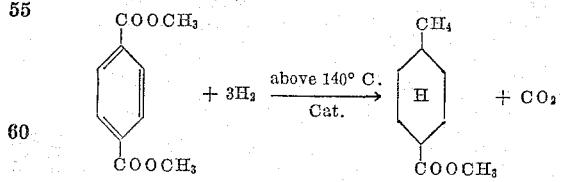

According to recently published studies (Siegel and McCaleb, JACS, 81, 3655 and Siegel and Dunkel, "Advances in Catalysis," edited by A. Farkas, vol. 9, p. 15), the catalytic hydrogenation of methyl phthalates generally yields a major portion of the cis isomer. The exact ratio of the isomers produced in the process according to this invention was not determined. The fact that the pure trans isomer melts close to 70° C., while the pure cis isomer melts at about 7° C., and the observation that the mixture of the two isomers as obtained in the process according to this invention, remains completely liquid at temperatures above 20° C., indicate that the ratio of the two isomers is not significantly altered by this modification of the hydrogenation conditions.

As to the starting material, pure dimethyl terephthalate, or any of the now available commercial grades of this product, which is made by converting technical terephthalic acid to its dimethyl ester, may be employed in the process according to this invention. Depending on the intended use of the final product, the purity requirements for the starting material are more or less stringent. If, for instance, the hydrogenated product is to be used in polymerization processes, it is important to select a grade which does not contain significant amounts of the isomeric dimethyl ortho- or meta(iso)-phthalates, or of a monofunctional compound. In any case, the starting material must be essentially free of products which poison the catalyst.

As to the solvent, pure (distilled) dimethyl 1,4-cyclohexanedicarboxylate can, of course, be used. It is, however, a preferred feature of this invention to employ, as the solvent, a portion of the crude previous batch, from which the spent catalyst does not have to be completely removed. Evidently, the presence of partially spent catalyst does not impede the hydrogenation reaction in a subsequent batch. Its presence is, in fact, beneficial since it reduces somewhat the amount of freshs catalyst which has to be added to assure complete hydrogenation in the allotted time cycle. The minimum amount of solvent to be used depends somewhat on the available equipment. In a suitably shaped autoclave, equipped with a high speed agitator which is capable of handling a viscous slurry, as little as 0.25 part of the crude or distilled hydrogenated product per part of dimethyl terephthalate may suffice. However, in ordinary hydrogenation equipment, not less than 0.5 part, and preferably about one part of the solvent, should be used in order to keep the catalyst in satisfactory suspension, and to assure good dispersion of the hydrogen gas in the liquid. Larger amounts of the solvent may be used, but are unnecessary and uneconomical.

An upper temperature limit of 140° C. is an important feature of this invention, as heretofore explained. A realistic lower limit is approximately 100° C., since at a still lower temperature the hydrogenation proceeds too slowly to be practical. Within this temperature range, the hydrogen pressure is not critical, but it is expedient to start the hydrogenation at approximately 600–700 p.s.i.g., and at an intial temperature of 100-110° C., and to complete the hydrogenation by raising the pressure finally to 800–900 p.s.i.g. at a final temperature of 120–130° C. Under these conditions the total hydrogenation time usually is approximately 2–3 hours on a laboratory scale and 6–8 hours in plant equipment. A higher maximum hydrogen pressure may be used, but is not necessary. As in the solvent hydrogenation methods disclosed in U.S. 2,070,770 and in its improved version illustrated in the second paragraph of Example 1 which follows, the use of pressures above 1000 p.s.i.g. requires, in plant production, a relatively larger capital investment for high pressure autoclaves.

As to the type and amount of the catalyst, the process according to the preferred embodiment of this invention can be operated satisfactorily by using, for this ester, the unprecedently small amount of only 0.0005 to 0.0007 part of catalytic ruthenium (in the form of 0.01 to 0.014 part of a standard 5% ruthenium on activated charcoal type catalyst) per part of dimethyl terephthalate to be hydrogenated. This minimum dosage of the catalyst is illustrated in Examples 2 and 3, where a portion of the previous charge which still contains some of the partially spent catalyst, is employed as the solvent. In the first example, where distilled dimethyl 1,4-cyclohexanedicarboxylate served as the solvent, the amount of the same catalyst had to be increased, since in this case no advantage was taken of the partially spent catalyst from the previous batch. Much larger amounts of the catalyst can, of course, be employed, but are unnecessary in this improved process, and are therefore uneconomical. It is to be noted that twice as much of the same catalyst had to be used when dioxane served as the solvent (Example 1, second paragraph) in order to complete the hydrogenation under otherwise comparable conditions.

As to other hydrogenation catalysts, the Raney nickel catalyst disclosed in U.S. Patent 2,070,770 is not sufficiently effective at the relatively low temperature to be used successfully in the process according to this invention. It is known that palladium or platinum type catalysts are favored only for hydrogenations under acid conditions. It is believed, however, that catalytic rhodium may be used successfully in the process of this invention in place of ruthenium catalyst. This opinion is supported by Charles H. Beede's report in "Massachusetts Institute of Technology, Seminar in Organic Chemistry" of November 12, 1958, that a rhodium-on-alumina catalyst was quite effective in the aromatic ring hydrogenation of somewhat related esters, but Beede also pointed out that "ruthenium catalysts operate at lower temperatures than most of the others."

In place of the activated charcoal which served as the support of the catalyst in the preparation of this preferred form of the ruthenium catalyst, other inert materials which are commonly employed for this purpose, such as for instance kieselguhr, may be used. It is known that the oxide of ruthenium may be used in place of the ruthenium metal in hydrogenations of this type, since the oxide is rapidly reduced to the catalytic metal by the hydrogen in the initial stages of the reaction.

Any of the commercially available types of steel or stainless steel autoclaves commonly used for catalytic pressure hydrogenations is suitable for this improved process, provided that the autoclave is equipped with an efficient agitator and is safe to be operated at pressures up to 1000 p.s.i.g.

As is illustrated in the representative examples, a heel from the previous batch may be left in the autoclave to serve as the solvent for the next charge to which fresh catalyst is added as required to complete the hydrogenation at the specified temperature. The completely hydrogenated charge may, if desired, be transferred into a storage tank, and portions of the substantially clear liquid may be decanted off after settling for a few hours to be refined by a final distillation (taking off a small foreshot), and to be used as the solvent for the next autoclave charge. If desired, all the spent catalyst and other suspended solid material may be removed from the crude reaction liquid by filtration or centrifuging to give a clear product which, after topping to remove the small amount of low boiling by-products, is satisfactory for use in some end-products.

EXAMPLES

The following representative examples illustrate the preparation of dimethyl 1,4-cyclohexanedicarboxylate from dimethyl terephthalate by the heretofore described novel process. The most significant and a priori unexpected advantage (avoiding excessive decarboxylation) achieved in this process as compared with the closest prior art method, is demonstrated by the results of a control experiment described in Example IV.

Example 1

950 parts by weight of dimethyl 1,4-cyclohexanedicarboxylate, 900 parts of dimethyl terephthalate, and 20 parts of a catalyst containing 5% ruthenium on charcoal, corresponding to 1.0 part of catalytic ruthenium, were charged into a hydrogenation autoclave, heated to 108° C. and treated with hydrogen under pressure, first at 600–800 p.s.i.g., finally at 800–1000 p.s.i.g. The exothermic nature of the reaction caused the temperature to rise to 120° C. during the hydrogenation. The crude reaction mass was clarified to remove the catalyst and distilled in the manner described in Example IV. It contained only 1.5% by weight of low-boiling impurities consisting mainly of methyl hexahydro-p-toluate.

A similar experiment using dioxane as solvent required the use of 40 parts of catalyst (2.0 parts of catalytic ruthenium) and a hydrogen pressure of 1300–1500 p.s.i.g. at 130° C. to complete the reaction. Fractional distillation was required to separate the dioxane from the product after removal of the catalyst.

*Example II*

Approximately one-half (950 parts) of a crude hydrogenation mass obtained by the procedure of Example I was returned to the autoclave, without clarification to remove the catalyst. 900 parts of dimethyl terephthalate and 10 parts of fresh catalyst (5% ruthenium on charcoal, corresponding to 0.5 part of catalytic ruthenium) were added, and the hydrogenation was carried out as in Example I. The hydrogenation proceeded rapidly at a maximum pressure of 1000 p.s.i.g. and a temperature of 120° C. The product was similar in quality to that produced in Example I.

*Example III*

Approximately 350 parts of a hydrogenation mass produced as in Example II was allowed to remain in the autoclave. 350 parts of dimethyl terephthalate and 5 parts of fresh catalyst (5% ruthenium on charcoal, corresponding to 0.25 part of catalytic ruthenium) were added and the charge was hydrogenated at a maximum pressure of 1000 p.s.i.g. and a final temperature of 130° C. The product was clarified to remove the catalyst and distilled to remove about 3% of low-boiling impurities and about 1.5% of non-volatile material.

*Example IV*

250 parts of dimethyl terephthalate, 250 parts of crude dimethyl 1,4-cyclohexanedicarboxylate from a previous charge made by the procedure described in Example I, and 7 parts of fresh catalyst (5% ruthenium on carbon) were charged into a pressure vessel, heated to 120–130° C. and hydrogenated at 800–1000 p.s.i.g. The product was filtered to remove the catalyst and was distilled in vacuum, with the results indicated below.

Total weight of the crude product to be distilled was 485 parts.

| | | |
|---|---|---|
| Foreshot (below 130° C./10 mm.) | 4 parts = | 0.825% |
| Product | 468 parts = | 96.5% |
| Residue | 4 parts = | 0.825% |
| Unaccounted for | 9 parts = | 1.85% |
| Total | 485 parts = | 100.00 |

On the assumption that the foreshot contained approximately 70% of methyl hexahydro-p-toluate (see analytical data cited below), only about 2.8 parts (0.58%) of this impurity was formed.

In an attempt to apply the alleged molten stage hydrogenation procedure (mentioned in U.S. 2,888,484, col. 1), to the dimethyl terephthalate, 350 parts of the same grade of dimethyl terephthalate and 10 pts. of the same catalyst used in the above-described run were charged into the same reactor, heated to 150–160° C. (to insure complete melting) and hydrogenated at 600–800 p.s.i.g. Hydrogenation was rapid. The product was filtered and distilled in the same equipment, with the following results:

The total weight of the crude product to be distilled was 339 parts.

| | | Percent |
|---|---|---|
| Foreshot (below 130° C./10 mm.) | 23 parts= | 6.79 |
| Product | 304 parts= | 89.68 |
| Residue | 7 parts= | 2.06 |
| Unaccounted for | 5 parts= | 1.47 |
| Total | 339 parts= | 100.00 |

Analysis of the foreshot material by "saponification number" indicated an equivalent weight of 133. On the assumption that the low boiling material is a mixture of dimethyl 1,4-cyclohexanedicarboxylate (equivalent weight 100) and methyl hexahydro-p-toluate (equivalent weight 156), the latter appears to be present in the foreshot to the extent of 69% by weight, or approximately 16 parts (4.7%) by weight of the crude reaction product.

It was concluded from these results that the higher temperature required in the hydrogenation of dimethyl terephthalate without a solvent results in the formation of considerably (approximately eight times) increased amounts of the most objectionable by-product and consequent loss of yield of the desired product.

The preceding representative examples may be varied, by one skilled in the art, as to nature of starting material, conditions of reaction and specific catalyst to give the described unexpected results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the process of preparing dimethyl 1,4-cyclohexanedicarboxylate by the catalytic hydrogenation of dimethyl terephthalate, the improvement wherein said dimethyl terephthalate is catalytically hydrogenated in mixture with from about 25% to 90% by weight thereof of dimethyl 1,4-cyclohexanedicarboxylate at a temperature within the range of 110° C. to 140° C. and under a pressure within the range of about 500 p.s.i.g. to about 1500 p.s.i.g.

2. The process of claim 1 wherein said dimethyl terephthalate is dissolved, prior to hydrogenation, in an approximately equal amount of dimethyl 1,4-cyclohexanedicarboxylate, said hydrogenation being carried out at a temperature within the range of 120° C. to 130° C. and under a pressure within the range of 750 p.s.i.g. to 1000 p.s.i.g., the hydrogenation catalyst comprising ruthenium supported by an inert substrate.

References Cited in the file of this patent

UNITED STATES PATENTS

| | | |
|---|---|---|
| 1,984,415 | Macallum | Dec. 18, 1934 |
| 2,888,484 | Dehm et al. | May 26, 1959 |

FOREIGN PATENTS

| | | |
|---|---|---|
| 286,201 | Great Britain | Oct. 3, 1929 |